Figure 1:
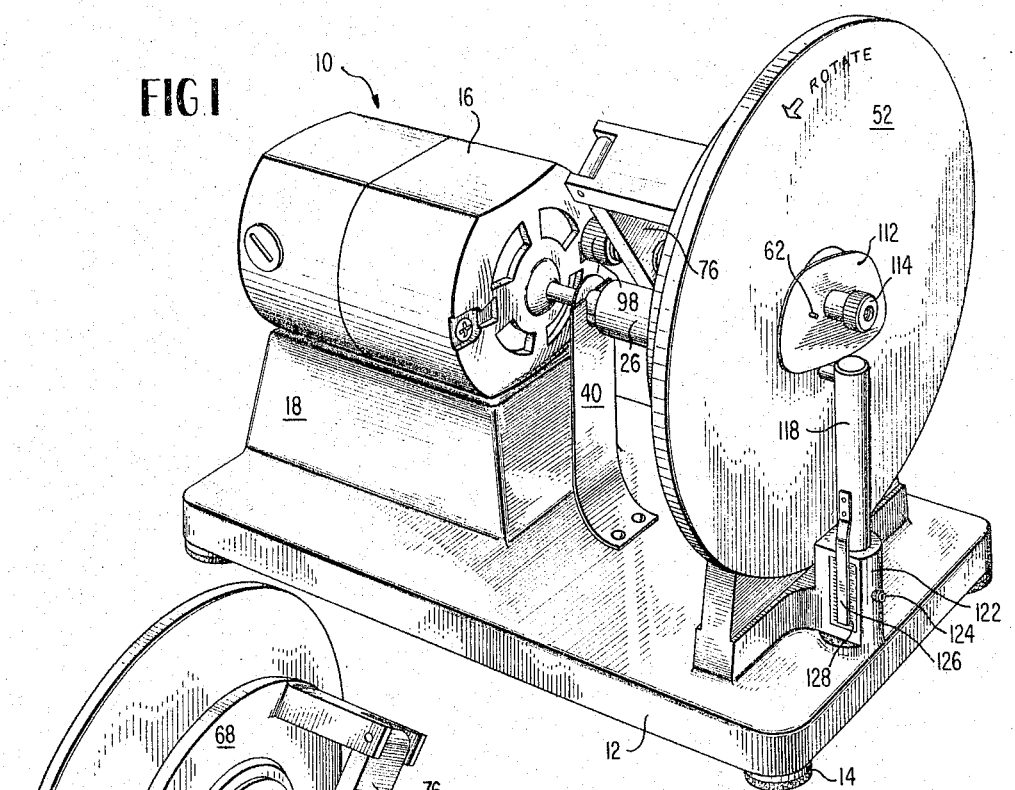

Feb. 7, 1967     E. E. MILNER, JR     3,302,337
LENS BLANK PERIPHERY GRINDER
Filed June 29, 1964     3 Sheets-Sheet 1

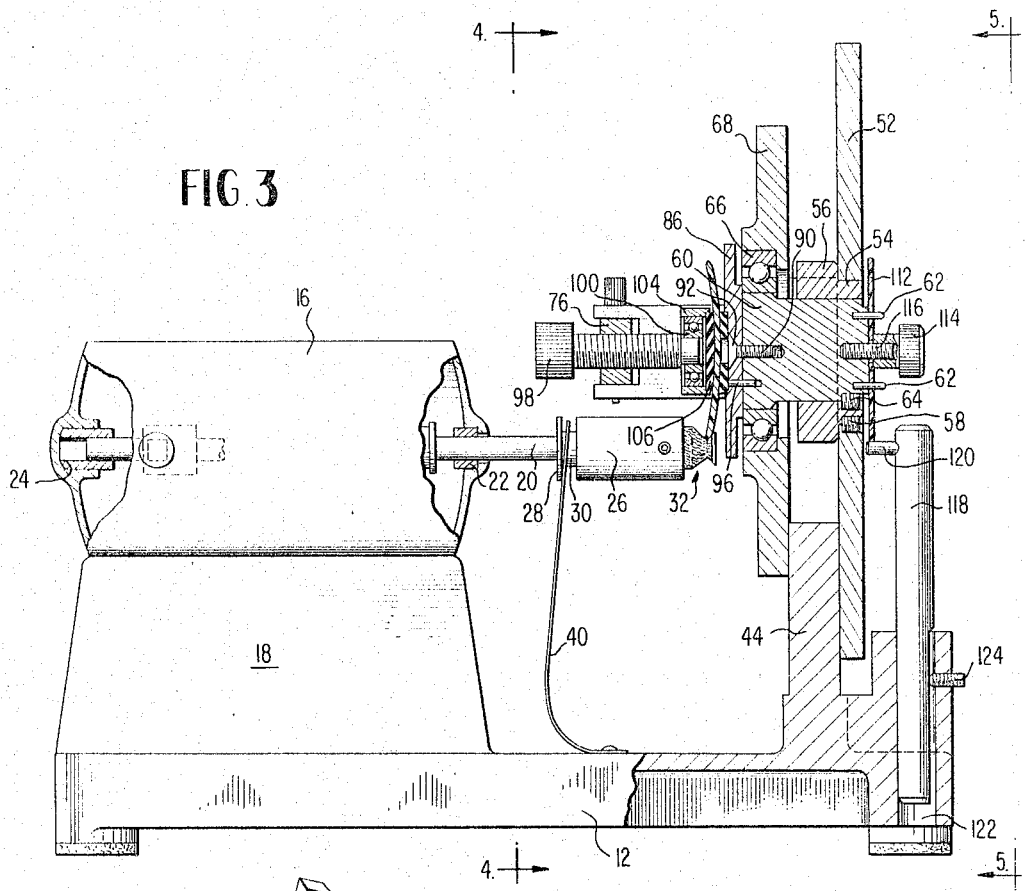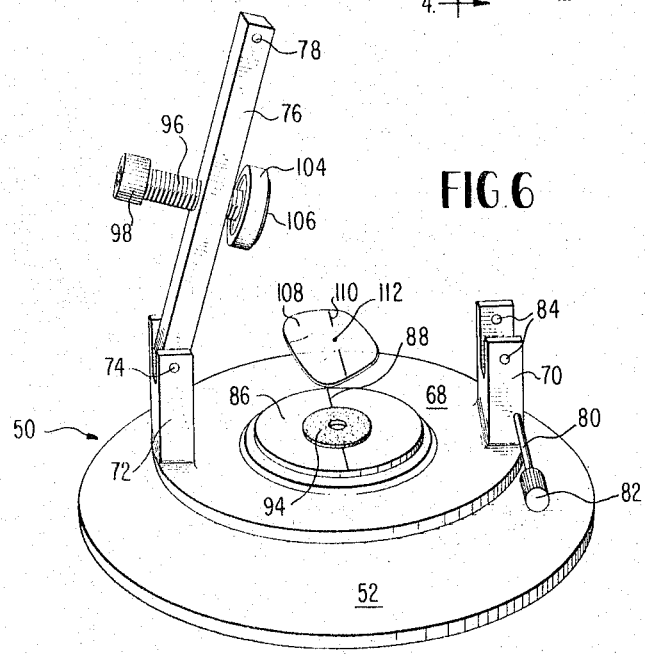

Feb. 7, 1967  E. E. MILNER, JR  3,302,337
LENS BLANK PERIPHERY GRINDER
Filed June 29, 1964  3 Sheets-Sheet 3

United States Patent Office 3,302,337
Patented Feb. 7, 1967

3,302,337
LENS BLANK PERIPHERY GRINDER
Edwin Earl Milner, Jr., Kingston, N.Y., assignor to Kirk Optical Lens Co., Inc., New York, N.Y., a corporation of New York
Filed June 29, 1964, Ser. No. 378,779
9 Claims. (Cl. 51—101)

This invention relates to a lens periphery forming machine, and more particularly to a machine for the peripheral grinding or cutting of plastic lenses for eye glasses.

In order to insert a lens in an eye glass frame, it is necessary that the peripheral configuration of the lens will precisely fit the aperture for it in the frame.

Lenses are manufactured in a circular or irregular form, having no finished edge surface. They are commonly known as uncut lenses, or lens blanks.

In order that uncut lenses, or lens blanks, may be shaped to fit particular frames, optical shops have available templates. These templates vary with the various frame configurations.

In order to place a lens in a frame, whether the frame is of metal or plastic, the periphery of the lens is so formed as by grinding, cutting or the like to impart to it an upstanding ridge or groove, usually a ridge. This ridge cooperates with a complementary continuous peripheral groove in the frame to form and maintain a firm holding or positioning of the lens. In this manner there is little tendency for the lens to slide out of the frame aperture. While it is not particularly difficult, in general, to provide a lens blank periphery with a ridge, it has been recognized that the provision of a lens blank periphery with an upstanding ridge located at a constant distance from one of the lens faces has not been a trivial problem.

In the event that a rotary grinder or cutter having a V-shaped cross-section at a portion above its diameter is employed, the final location of the ridge with reference to a given lens face might depend on where the grinding instrument initially contacted the periphery of the lens. The problem is somewhat aggravated by the fact that the thickness of many lens blanks is not constant. Thus, many lens blanks are thicker at their peripheral portions than at their central portions or vice versa.

In order to insure that the ridge will be at a constant distance from one face, usually the front face of the finished lens, the prior art has known of certain machines employing somewhat complex and not inexpensive cams for maintaining the grinding surface of a tool which bears against and grinds or cuts the periphery of the lens blank at a certain predetermined distance from the front face of the lens blank.

While certain such machines have been successful, many have suffered the disadvantage of rather high initial expense and also from relatively complex mechanisms which necessitate manufacturing and maintenance procedures at a level which precludes many small optical shops from being able to purchase such lens duplicating grinding machines.

It is accordingly an object of the present invention to provide a lens grinding or cutting machine for plastic lenses which is simple to operate and yields a finished lens duplicate having a centering ridge at a predetermined distance from its front face.

It is a further object of the present invention to employ a lens grinding and duplicating machine employing a template, wherein the template enables the rapid duplication of the outline of a lens and wherein a centering ridge for a duplicated lens is at a predetermined distance from its front face.

It is a further object of the present invention to provide a lens grinding machine employing an electric motor for driving a grinding or cutting tool against the periphery of a blank lens wherein the armature of the motor is weakly biased towards the motor.

These and other objects of the present invention will be apparent from the following description.

Figure 2:
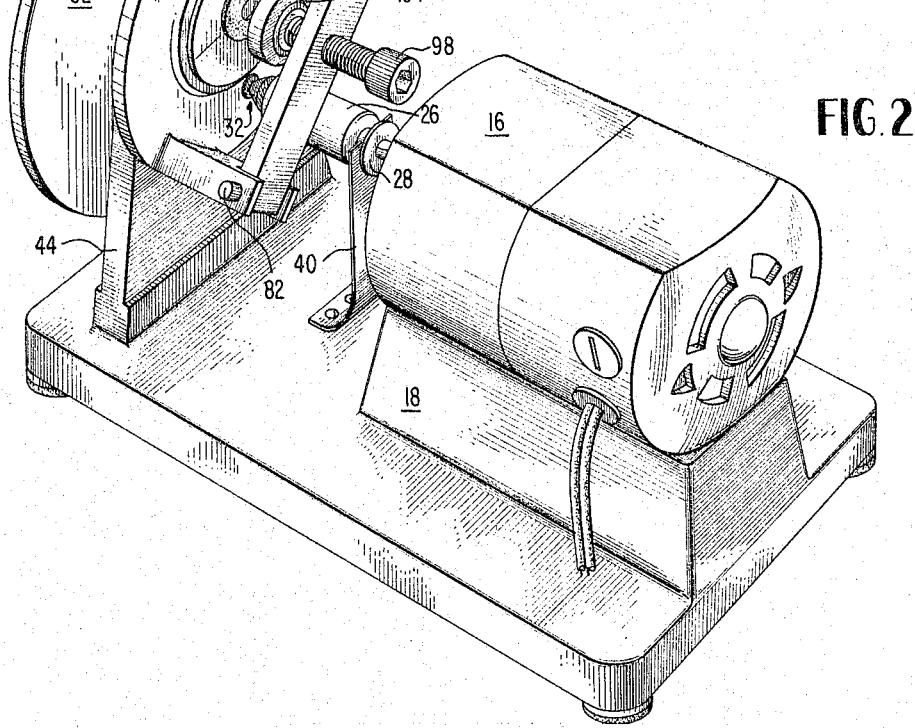
Figure 4:
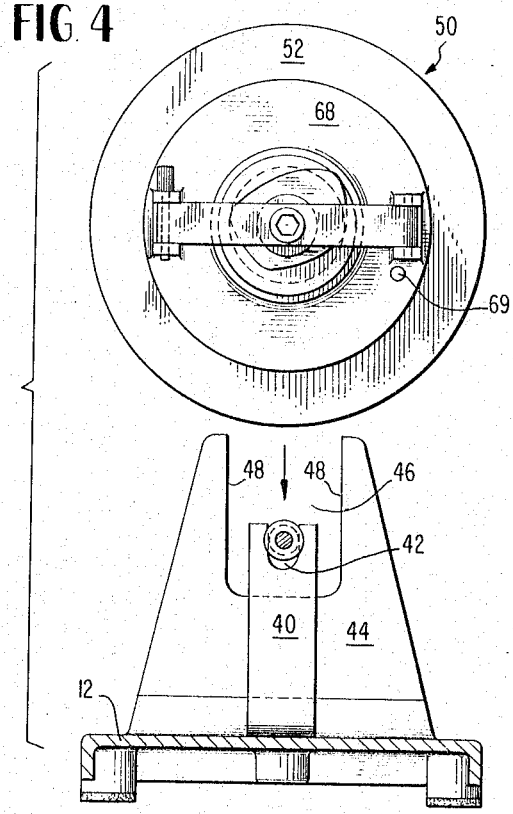
Figure 7:
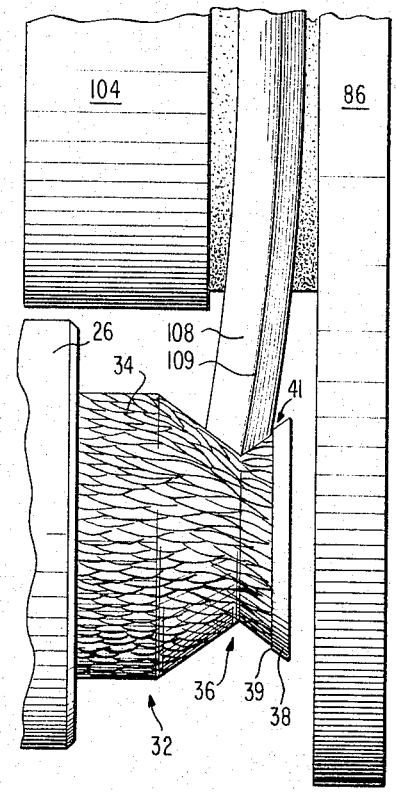
Figure 5:
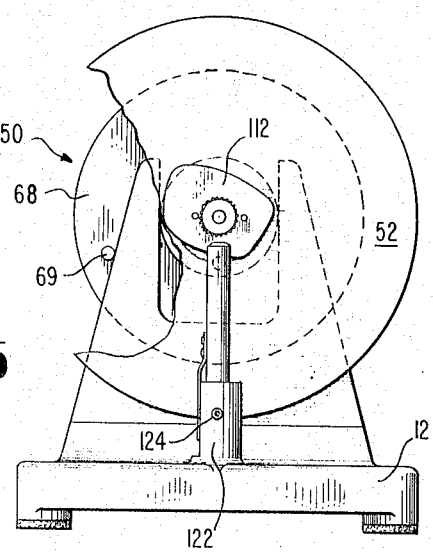
Figure 8:
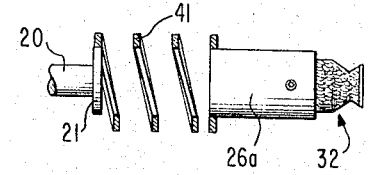

In the drawings:
FIG. 1 is a perspective view of the lens periphery grinding and duplicating machine of this invention.
FIG. 2 is another perspective view of the machine of FIG. 1.
FIG. 3 is a partial side cross-sectional view of the lens grinding and duplicating machine of FIG. 1.
FIG. 4 is a view taken along line 4—4 of FIG. 3.
FIG. 5 is a view taken along line 5—5 of FIG. 3.
FIG. 6 is a perspective view of the lens blank clamping arrangement and turning wheel shown in FIG. 2 of the drawings.
FIG. 7 is an enlarged view of a portion of FIG. 3.
FIG. 8 is a partial cross-sectional view of an alternative embodiment for supplying a bias to the grinding member.

Referring now to FIG. 1 of the drawings, the numeral 10 denotes generally the lens periphery grinding or cutting machine of this invention and includes a base 12 having a plurality of padded feet 14. An electric motor 16 is mounted on an upstanding portion 18 of base and includes an elongated armature 20 rotatably supported in bearing members 22 and 24. In practice shims may be removed from the interior of a conventional motor to provide a maximum of axial play for the armature. A collar 26 is frictionally positioned on the right end of armature 20 (see FIG. 3) by a set screw. The left edge of collar 26 carries a flange 28 and a reduced diameter portion 30. The right end of collar 26 carries a grinding member denoted generally by the numeral 32 and held in collar 26 by a set screw. A flat spring steel strip 40 is fixed at its lower end as by a rivet to the base 12 and its upper end is bifurcated to define a space 42 (see FIG. 4) between the bifurcation. The bifurcations straddle the reduced portion 30 of collar 26 with the spring 40 so adjusted to weakly bias the grinding member 32 to the left as viewed in FIG. 3.

The numeral 44 denotes an upstanding bifurcated standard preferably integral with base 12, the upper bifurcated portion of the standard defining a space 46 therebetween bounded by parallel faces 48.

The numeral 50 (see FIG. 6) denotes generally a hand rotatable lens blank clamp member disc now to be described. The numeral 52 denotes a disc adapted to be rotated in the direction illustrated in FIG. 1 of the drawings by manually grasping its periphery. The numeral 54 denotes an extending flange portion of collar 56 with the disc 52 snugly fitting flange 54 and abutting against the main portion of collar 56. A set screw 58 is threaded at the juncture of the aperture in disc 52 and flange 54. The numeral 60 denotes a hub whose right end (see FIG. 3) carries a pair of projecting pin elements 62 positioned therein as by a frictional fit. The numeral 64 denotes a set screw positioned in a threaded aperture midway between the juncture of the aperture of collar 56 and the hub 60. Thus, set screws 58 and 64 preclude relative rotation between the elements which they contact.

The left portion of hub 60 carries a ball race 66 with the outer portion thereof mounted in an undercut of a yoke element 68. The yoke element 68 carries two diametrically opposite upstanding bifurcated legs 70 and 72. Pivot pin 74 passes between the bifurcations of leg 72 and pivotally retains swingable arm 76. The other end of arm 76 is provided with an aperture to be traversed by a removable pin 80 having an enlarged end 82 to facilitate manual gripping. The pin 80 is adapted to be pushed through aperture 78 in arm 76 to hold the arm 76 in the position illustrated at FIG. 2 of the drawings.

The numeral 86 denotes a table affixed to the left portion (see FIG. 3) of hub 60 and carries a straight indicia line 88 extending diametrically across. The table 86 is secured to hub 60 by means of a screw 90 having a recessed head portion 92. For a reason which will appear later in the description, the recessed head portion 92 may be centrally provided with a suitable indicating mark such as a small dab of red paint or the like.

The numeral 94 denotes a rubber-like washer element having a central aperture mounted in an undercut portion on the left face of table 86. A pin 96 extends between table 86 and hub 60 to preclude relative rotation between these elements.

Referring now to FIGS. 3 and 6 of the drawings, the swingable bar 76 carries a threaded screw member 96 centrally thereof with its outer end portion carrying an enlarged hand-gripping portion 98. The other end of screw 96 is of reduced diameter and carries one portion of a ball-race 100. The outer element of the ball-race is secured to a sleeve 104 whose right portion (see FIG. 3) is counter-sunk and carries a rubber-like washer element 106. This construction allows for relative rotation between screw 96 and sleeve 104 its washer 106 carried thereby.

Referring now to FIGURE 6, the numeral 108 denotes a plastic lens which has already been peripherially cut and is provided with an easily erasable indicia line 110 extending through the ophthalmic center thereof. The numeral 112 denotes an easily erasable mark on the ophthalmic center of the lens. A lens blank is placed on top gasket 94 so that the point 112 is directly above the indicating point in the recess 92 and line 110 of the lens is aligned with line 88 on disc 86. After such placement, the arm 76 is swung downwardly from the position shown at FIG. 6 and the pin 80 inserted to thereby lock arm 76 in the position illustrated at FIG. 2 of the drawings. If desired, a final adjustment may be made by turning portion 98 of the screw 96 so that the lens blank is firmly positioned between the rubber-like washer elements 94 and 106.

Referring now to FIGS. 1 and 3 of the drawings, the numeral 112 denotes a template having a pair of apertures adapted to fit on the extending pins 62. This template is one of a plurality of standard shapes and is selected from a set of templates to match the outline of a lens to be shaped. The numeral 114 denotes a thumb nut screwed over and onto extending threaded stud 116 carried by the central portion of hub 60. The numeral 118 denotes a vertically adjustable standard carrying a laterally extending abutment pin 120. A socket 122 is provided in base 12 and carries a set screw 124 adapted to bear against a flat portion of standard 118 to thereby vertically adjust it. The numeral 126 denotes an indicator of sheet material having its upper end firmly fixed as by rivets to standard 118 and whose lower end is adapted to function as an indicator. The numeral 128 denotes a scale affixed to the exterior of socket 122.

Referring now to FIG. 7 of the drawings, it will be observed that the external grinding surface of grinding element 32 is composed of a plurality of tool steel cutting flutes 34, preferably spiral. A V-shaped notch in cross-section is defined by the juncture of two partial cone elements. The right portion of cutting element 32 carries a continuous abutment shoulder 38. The numeral 39 denotes a radius of curvature of the order of three one-thousandths of an inch. The vertical distance between the extreme right cutting surface of tool 32 and the exterior conical surface of abutment 38 is also preferably of the order of three one-thousandths of an inch. It has been determined that a greater height will result in scarring the lens face and a lesser height will result in the abutment slipping or sliding off the lens blank face. Shoulder 38 may be fomed of brass and is pressed into the illustrated position at the right end of grinding member 32 as by swaging. The right end of grinding member 32 is provided with a centrally protruding boss, and shoulder 38 is centrally apertured with the boss periphery swaged onto the periphery of the aperture of 38. The height of cutting flutes 34 is of the order of one one-hundredth of an inch.

Referring now to FIGS. 4 and 5 of the drawings, the entire unit 50 is lowered from the position of FIG. 4 to the position of FIG. 5 until the peripheral portion of template 112 abuts pin 120 of standard 118. The bifurcated portions of standard 44 extend between discs 68 and 52 (see FIG. 3) and the spacing between these discs is such that there is contact made between the interior facing surfaces of discs 52 and 68 and the parallel flat faces of upstanding portion 44. This contact helps to maintain the element 50 in a wobble-free relationship with respect to the base and cutting element 32.

In the illustrated position of FIGURE 3, the abutment pin 120 carries the entire weight of unit 50 through contact with the template 112. In practice however, the lens blank is initially larger than the template so that first contact is generally made between the grinding element 32 and the unground periphery of the lens blank. The template is positioned by pins 62 relative to indicia line 88.

When the unit 50 of FIG. 4 is placed downwardly in the direction of the arrow to assume the position of FIG. 5, the collar 26 carrying the grinding element 32 is manually positioned so that initial contact is made in the V-shaped groove 36 with the periphery of the lens blank. With the grinding element 32 rotating, an initial radial cut is made in the lens blank (the blank being generally larger than the template). Thereafter, the disc 52 is rotated in the direction indicated in FIG. 1 of the drawings. The spring 40 produces a slight biasing force urging the grinding element 32 towards the motor 16. The shoulder 38 bears against the front face of the lens blank so that a ridge 109 is formed which is always at a constant distance from the front right face of the lens blank. This contact between the front face of the lens blank and abutment 38 is denoted by the numeral 41 in FIG. 7.

With continued rotation of disc 52, disc 68 rotates therewith until abutment pin 69 (see FIG. 5) contacts the left upstanding leg of standard 44 and thereafter further clockwise rotation of yoke 68 is precluded. The reader will observe that with rotation of disc 52, the yoke 68 will not rotate any further while collar 104, with the lens blank, table 86, hub 60 and template 112 will all rotate with disc 52. As disc 52 continues to rotate, the periphery of the lens blank is ground or cut to assume the exact peripheral configuration of template 112. It will be observed that in the event that the lens blank exhibits a compound, serpentine, or other undulating curvature, the tool 32 will faithfully follow the undulations by virtue of the spring force derived from biasing spring 40 always urging shoulder 38 in contact with the right face of the lens blank. During the grinding operation, the axial play of the armature 20 with respect to the motor 16 permits the tool 32 to follow any undulations of the lens blank. During rotation of the disc 52, it will be observed that the entire unit 50 rides up and down in slot 46 with the parallel sides 48 of the slot bearing against the external sides of collar 56 thus precluding any side-wise movement of the unit 50.

Referring now to FIGURE 3, when the top of abutment pin 120 and the top of V-groove 36 (see FIG. 7) are the same height during grinding, the size of the ground lens blank is the same as the size of template 112. When this size is desired, adjustable standard 118 is set so that the lower edge of indicator 126 is at the lowest reading on scale 128. The lowest reading is "36," meaning the standard 36 mm. diameter across the ophthalmic diameter of the lens. In the event that a lens is desired having an ophthalmic diameter of 38 mm., standard 118 is raised one millimeter as measured by indicator 126 and scale 128. Thus, for every increase of one unit of the height of standard 118, the ophthalmic diameter of the finished lens blank will increase by two units.

Referring now to FIGURE 8 of the drawings, an alternative embodiment for supplying the bias to grind member 32 is illustrated. Armature 20 of motor 16 terminates in an enlargement 21 around which is secured one end of a torque transmitting coil spring 41. The other spring end is secured to a collar 26a, similar to collar 26 but without a reduced portion, which in turn carries grinding member 32. In this embodiment, the coil spring 41 both transmits torque from armature 20 to grinding member 32 and supplies bias to the grinding member 32 so that the latter, when in the position of FIG. 3, is urged to the left.

In practice, the proper amount of bias urging the cutting member 32 leftward, so that the shoulder 38 follows the face of the lens blank is easily determined. Thus the spring 40 may be bent until it biases the motor armature only slightly towards the motor. This results in the shoulder 38 gently bearing against the lens blank face so as not to scar it.

The terms cutting and grinding have been used interchangeably. While a plastic lens may have its periphery formed by cutting, a glass lens may require grinding, i.e., the use of an abrasive in addition to a rotating tool bearing against the periphery of the blank. The present invention is susceptible of application in both plastic and glass blanks.

I claim:

1. A lens blank periphery grinding machine including a base, a template following mechanism mounted on said base, said template mechanism including means for holding a lens blank, a rotary grinding member having a grinding surface and carrying a continuous abutment at an axial end thereof, said abutment being of larger diameter than the grinding member surface contiguous thereto to thereby define a lens blank face abutment shoulder adopted to bear against one face of a lens blank, said grinding member being axially biased in that direction defined by going from the said abutment towards said grinding surface, said grinding member being axially movable in 2. A lens blank periphery grinding machine including a base, said base carrying a rotary grinding member having a grinding surface, said grinding member having a continuous abutment at an axial end thereof, said abutment being of larger diameter than the grinding member surface contiguous thereto to thereby define a lens blank face abutment shoulder adapted to bear against one face of a lens blank, said grinding member being axially biased in that direction defined by going from the said abutment towards said grinding surface, said grinding member being axially movable in response to said bias, and means for holding a lens blank adjacent said grinding member.

3. A lens blank periphery grinding machine including a base, an upstanding member on said base, a lens blank clamp and template member positioned on said upstanding member and adapted to reciprocate and rotate thereon, said clamp member including an abutment engaging said upstanding member to preclude relative rotation for a complete circle, a lens blank clamp having a swiveled lens face engaging member, a turnable member rotatably journaled in said lens blank clamp member, one portion of said turnable member extending through the clamp member and forming a table adapted to engage one face of a lens blank, whereby a lens blank may be engaged on one of its faces by the swiveled face engaging member and on its other face by the table, and whereby a lens blank may rotate with rotation of the turnable member relative to the base.

4. The lens blank periphery grinding machine of claim 3 wherein said lens blank clamp and template member carries means to fasten a lens template thereon and wherein said base carries a vertically adjustable abutment adapted to engage a lens template.

5. The lens blank periphery grinding machine of claim 3 including a rotary grinding member having a grinding surface, said grinding member carried by said base and adapted to grind the periphery of a lens.

6. The lens blank periphery grinding machine of claim 5 wherein said grinding member has a continuous abutment at one axial end thereof, said abutment being of a larger diameter than the grinding member surface contiguous thereto to thereby define a lens blank face abutment shoulder adapted to bear against one face of a lens blank, said grinding member being axially biased in that direction defined by going from the said continuous abutment towards said grinding surface.

7. The lens blank periphery grinding machine of claim 2 wherein the axis of rotation of said grinding member is horizontal and said bias is supplied by a spring exerting a turning moment about an axis at an angle to the axis of rotation of the grinding member.

8. The lens blank periphery grinding machine of claim 2 wherein said grinding member is coupled to a shaft by a coil spring, the shaft adapted to be rotated by a motor, the coil spring supplying the bias and also adapted to transmit torque from the shaft to the grinding member.

9. The method of forming a lens having a ridge on its periphery from a lens blank, including the steps of rotating the lens blank relative to a rotating grinding tool having a V-shaped groove on its exterior grinding surface, biasing the rotating grinding tool along an axis generally at right angles to the plane of the lens blank, and maintaining the apex of the peripheral ridge a constant distance from the peripheral portion of one face of the lens blank by direct contact between the said peripheral portion of one lens blank face and a portion of the grinding tool.

References Cited by the Examiner
UNITED STATES PATENTS
1,672,573   6/1928   Maynard _____ 51—101.1 X ROBERT C. RIORDON, *Primary Examiner.*

L. S. SELMAN, D. KELLY, *Assistant Examiners.*